March 16, 1926.  1,576,848
F. REESE
PLOW
Filed May 28, 1925   2 Sheets-Sheet 1
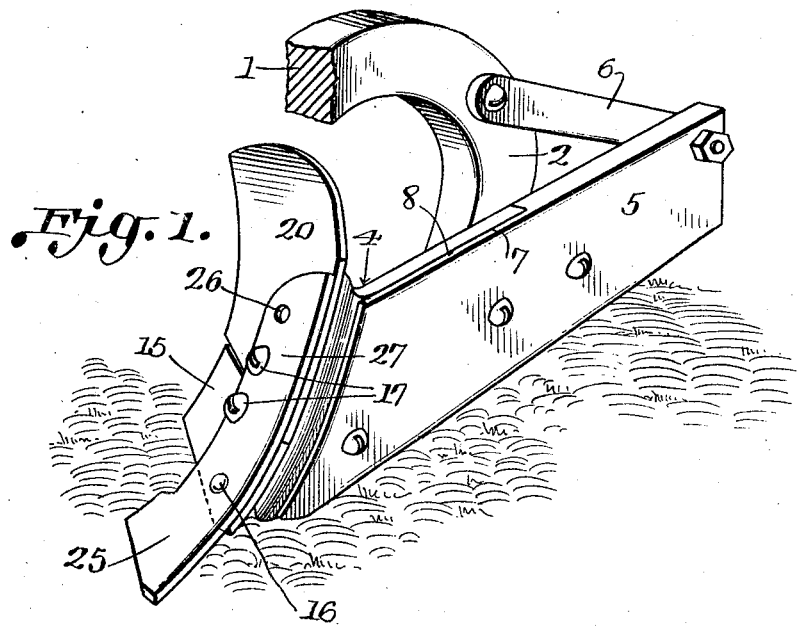
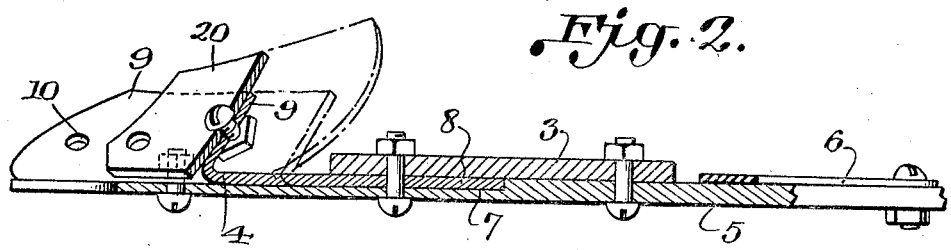
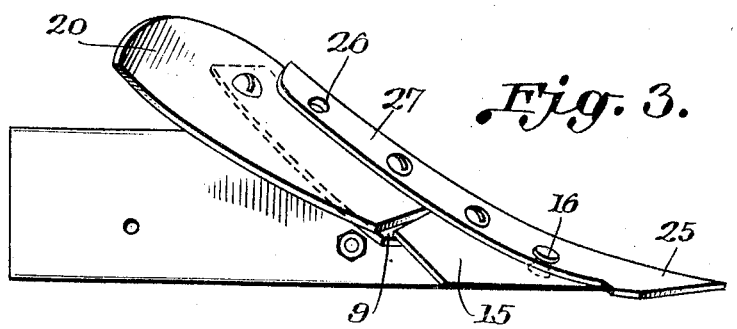
Inventor
Frederick Reese
By C. A. Snow & Co.
Attorneys March 16, 1926.  1,576,848
F. REESE
PLOW
Filed May 28, 1925  2 Sheets-Sheet 2
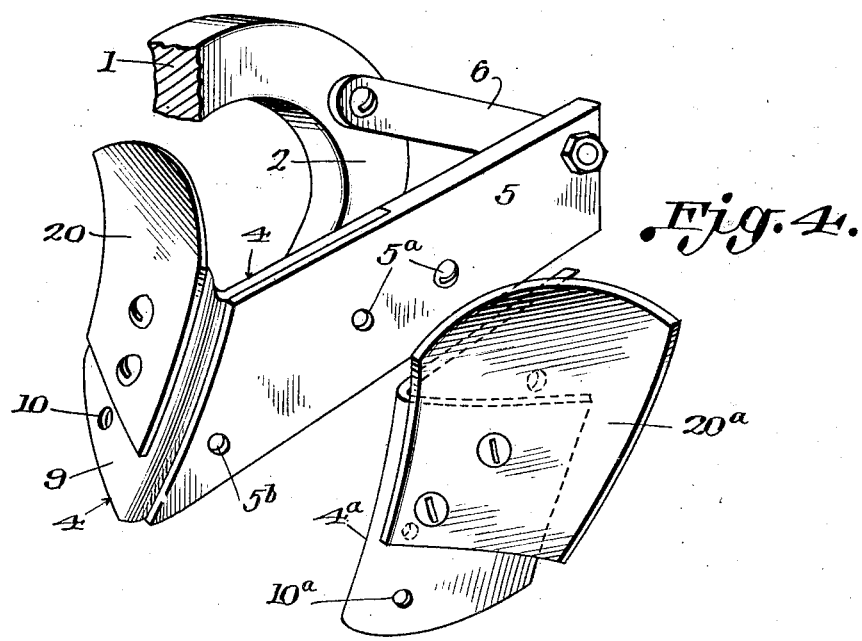
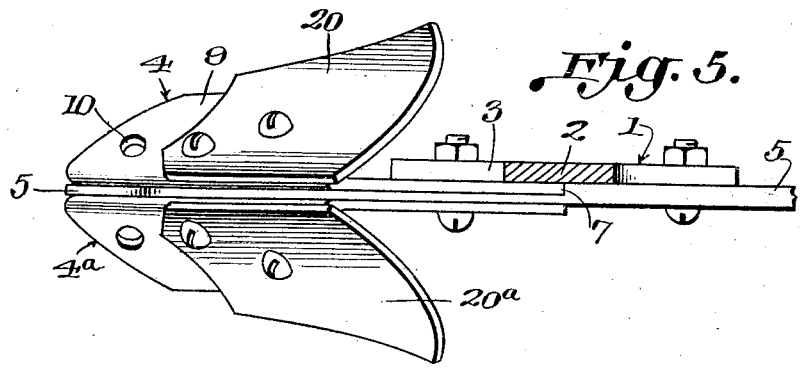
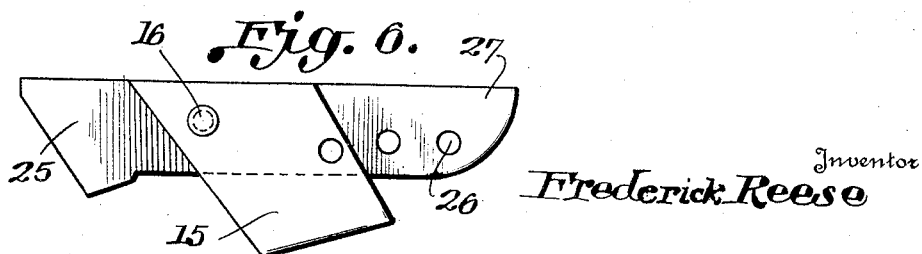
Inventor
Frederick Reese
By C. A. Snow & Co
Attorney Patented Mar. 16, 1926.

1,576,848

UNITED STATES PATENT OFFICE.

FREDERICK REESE, OF EUTAW, ALABAMA.

PLOW.

Application filed May 28, 1925. Serial No. 33,500.

*To all whom it may concern:*

Be it known that I, FREDERICK REESE, a citizen of the United States, residing at Eutaw, in the county of Greene and State of Alabama, have invented a new and useful Plow, of which the following is a specification.

This invention relates to plows and the object thereof is to provide a two-in-one plow, that is a plow combining a buster plow with a turning plow thereby saving the cost of one plow.

Another object of the invention is to provide a plow equipped with a point so constructed that the life thereof will be greatly prolonged which is due to the fact that the point may be lengthened when worn and which prevents wearing of the wings and which takes the ground better and runs easier than an ordinary point and which wears sharp by use.

Another object is to so construct a plow that it may be converted into a turning plow, a left-hand plow or a buster.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of a portion of a plow constructed in accordance with this invention with the beam shown broken out for convenience in illustration;

Figure 2 is a horizontal section thereof;

Figure 3 is a side elevation of the point support with the plow share, the moldboard or wing and the point shown in operative position thereon;

Figure 4 is a perspective view taken from the land side of the plow showing the point and the share removed and with a wing and its support shown arranged thereto in juxtaposition ready for assembling to convert the plow into a middle buster;

Figure 5 is a top plan view showing the wings mounted on the plow for use as a buster; and Figure 6 is a bottom plan view of the plow point with the share shown attached thereto.

The plow beam 1 is preferably constructed of a metal bar having its rear end turned downwardly substantially at right angles thereto to form a standard 2 which is equipped at its lower end with a T-head 3 to which is bolter a land side 5 and a combined wing and point support 4. The rear end of the land side is connected with the beam by a brace 6. The front end of the land side 5 is mortised out as shown at 7 to receive the straight arm 8 of the supporting member 4 as is shown clearly in Figs 1 and 2. The front end of the point support 4 has a laterally extending plate 9 carried thereby and which is bent at an acute angle to the body portion 8 of the support. This plate 9 is provided with a plurality of longitudinally extending spaced bolt openings 10, three of which are here shown and which are designed for connecting to the support the mold board or wing 20, the plow share 15 and the point 25 as is shown clearly in Fig. 1. The plow share 15 is riveted to the point 25 at 16 and the upper edge thereof abuts the lower edge of the moldboard 20 so that when the bolts 17 are placed in operative position the point and the share will be securely mounted on the support 4.

The point 25 has a rearwardly extending plate 27 in which is formed a plurality of longitudinally alined spaced apertures 26 to receive the bolts 17 so that when desired the point may be adjusted. This is desirable in case the point becomes worn and to avoid the necessity of resharpening it these bolts are removed and the rivet 16 knocked out and the point lengthened.

When the plow is to be used as a turning plow as shown in Figure 1 the land side 5 and the point support 4 are bolted together to the foot or T-head 3 of the plow beam 1 on the left hand side thereof and the rear end of said land side secured to the standard 2 by the brace 6. This positions the wing 9 of the support 4 at the right hand side of the plow and on the support is mounted the moldboard 20, the plow share 15 and the point 25. The point 25 is secured to the share 15 by rivet 16 at a point in advance of the bolted connection of the share with the point plate 27 and with the plate 9. When the point 25 becomes worn it may be lengthened in the manner above set forth by striking out the rivet 16, removing the bolts 17 and moving the plate 27 downward, then replacing the bolts in the apertures which register with those in the support 9 and in the moldboard and plow share. It will thus be seen that by lengthening the point 25 the life thereof will be greatly prolonged and the use of the point will operate to sharpen it.

When the plow is to be converted into a middle buster as shown in Figure 5, an additional supporting plate 4ª is mounted on the left side of the land side 5 by removing the bolt which connects the land side with the member 4 then placing the support 4ª in position and reinserting these bolts. This support 4ª carries another moldboard 20ª similar to the moldboard 20 except that it is made a left hand moldboard instead of a right and it will similarly carry a share constructed like the share 15 except that it is made a left share instead of a right.

To convert the plow into a left hand plow the support 4 and the parts carried thereby are removed while support 4ª and the parts carried by it are substituted on the other side of the land side and the land side is shifted by disengaging the bolts which connect it with the foot of the beam and placing the beam on the opposite face of the land side. It is of course understood that the brace 6 will also be similarly changed.

From the above description it will be obvious that the plow herein shown may be quickly and easily changed from a right hand plow to a left hand turning plow or from a turning plow into a middle buster.

I claim:

1. A plow beam and standard, a point support attached to and extending forwardly from the lower end of said standard, a plow share and moldboard mounted on said support, and a plow point longitudinally adjustable on said support to provide for lengthening of the point when worn, said point and share being riveted in advance of the supporting member, the rivet being designed to be broken out when the point is to be lengthened.

2. In a plow, a standard, a land side bolted to said standard, a supporting member bolted to the front end of said land side and to said standard, a moldboard and share bolted to said support, and a plow point having an apertured plate bolted to said support and riveted to said share to provide for the longitudinal adjustment of the point to lengthen it when worn.

3. In a plow, a standard, a land side bolted to said standard, a supporting member substantially V-shaped in form with one arm apertured for bolting to said land side and standard, a moldboard and share bolted to the free arm of the support, a plow point having a plate overlying the moldboard and share and riveted to the latter, and bolts connecting said plate to said support.

In testimony that I claim the foregoing as my own, I have hereto affixed my signature.

FRED REESE.